May 16, 1950 L. I. KASTE 2,507,908
FISH LURE
Filed Jan. 7, 1949

INVENTOR.
Louis I. Kaste
BY
McMorrow, Berman & Davidson
ATTORNEYS

Patented May 16, 1950

2,507,908

UNITED STATES PATENT OFFICE 2,507,908

FISH LURE

Louis I. Kaste, Mahnomen, Minn.

Application January 7, 1949, Serial No. 69,746

3 Claims. (Cl. 43—42.03)

This invention relates to artificial bait and the like, and particularly to an automatically-moved fish lure which operates by drawing the same through the water.

The main object of my invention is to provide automatically-moving means forming artificial bait to simulate lifelike movements of a fish in such manner as to attract the attention and interest of fish intended to be caught and inciting them to bite.

Another object is to provide a fish lure which has a hinged action plate at the forward end thereof to which the fish line is attached and which serves to produce an automatic sidewise motion which simulates that of a small, lively fish.

A further object is to have the fish lure provided with an elongated, arcuate body which diminishes in cross-section toward both ends with operating parts disposed at both ends and beneath an intermediate portion thereof to form a balanced arrangement effective to cause movement of the lure when drawn at any rate of speed through the water.

It is also an object to have a fish lure of the character indicated provided with a stabilizing plate intermediate the ends thereof for regulating the movements of the lure body and preventing the same from going into a spin or other undesired motion.

In other words, an important object in view is to provide the lure body with a front-action plate in combination with an intermediately-located, stabilizing plate in order to produce well-regulated movements of the lure as a whole under perfect control at all times.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which.

In the views, the same reference numerals indicate the same or like parts.

Figure 1:
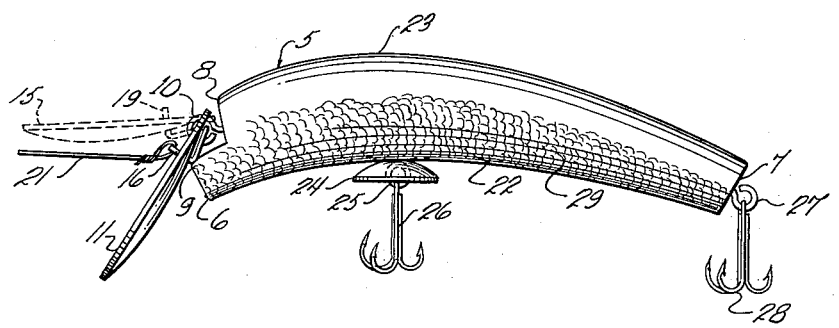
Figure 1 is a side elevation of a fish lure made according to the invention and embodying the same in a practical form.
Figure 2:
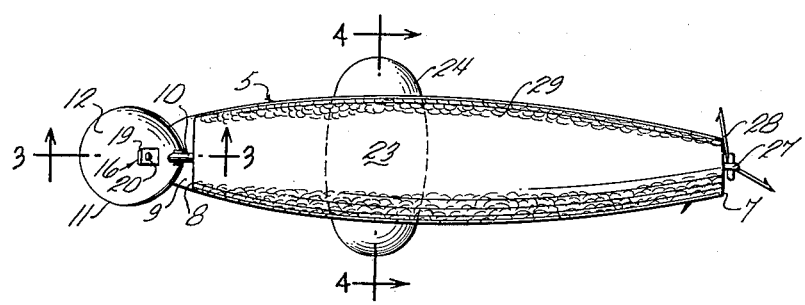
Figure 2 is a plan view of the same fish lure as seen from the top in Figure 1.
Figure 3:
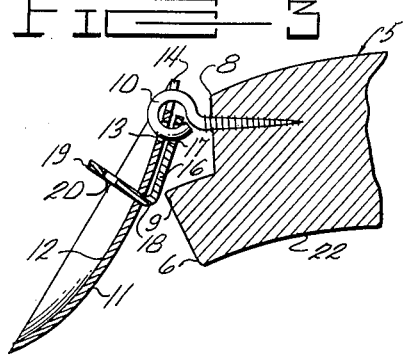
Figure 3 is an enlarged fragmentary section taken on line 3—3 in Figure 2.
Figure 4:
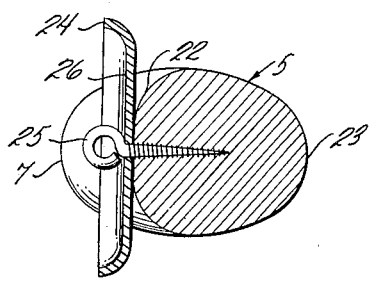
Figure 4 is an enlarged transverse section taken on line 4—4 in Figure 2.

It is a well known fact that when fishing it is desirable to have bait of such character as to attract the fish intended to be caught, and that among other features of bait which are highly desirable is the feature of having the bait simulate a small fish in its movements when drawn through the water. In fact, if the movements are sufficiently lifelike, it is not necessary that the bait be of such character as to be even partly of edible material, for the bait may be entirely artificial and provided with appropriate hooks so long as the movements are of such character as to deceive an approaching fish that a minnow or small bait fish is swimming through the water in readily accessible position. While various kinds of lures have heretofore been used, many are without actual movement, while others are intended to have some kind of motion, but a sidewise movement that will so closely simulate the movements of a lively minnow is hardly to be found among the lures available. Therefore, upon considering this problem, it has occurred to me that if the body of a lure or artificial bait were provided with a moving member and a stationary member so relatively located that continuous sidewise movements are produced when drawing the lure through the water, these movements being also well regulated so as to eliminate any undesirable features or movements in the meantime, the movements of the lure will be entirely under control.

I have succeeded in producing a lure having very satisfactory movements in the water and of such character as will now be more fully described. Hence, in the practice of my invention, and referring again to the drawing, a lure body generally indicated at 5, is of a generally round or elliptical cross-section and tapers slightly toward its forward end 6, and even more so toward the rear end 7. In the forward end of the lure body is a recessed portion 8 forming a stop shoulder 9 upon the lower portion of the end 6. In the recessed portion 8 is secured a screw eye 10 in which is hingedly mounted a scoop-shaped action plate 11 which is slightly concave, as indicated at 12, upon its forward face, the screw eye engaging in an aperture 13 in the upper portion of action plate 11 and also engaging between the sides of an upwardly-open slot portion 14 in such fashion that plate 11 is capable of hingedly swinging forward in an upward direction, as indicated at 15 in broken lines in Figure 1, upon the screw eye. However, it is prevented from executing any sidewise movement by the fact that both the aperture 13 and the slot 14 simultaneously engage with two opposite parts of the screw eye, and thereby guide the same in a vertical plane of movement. Upon the screw eye, and rearwardly of plate 11, is mounted a line anchor 16, the screw eye engaging in the aperture 17 in the upper end of anchor member 16, while intermediate the ends of the latter member the same is bent at 18 to form an elbow from which the other end 19 projects forwardly through action plate 11, extending a short distance beyond the forward limits thereof. There is an aperture in said end 19 at 20 to which a fish line 21 is normally attached. The arrangement is such that when fish line 21 is pulled forwardly through the water, the tension on the line will tend to raise action plate 11 to a more or less horizontal position, as indicated at 15, out of contact with shoulder 9, when the lure body 5 trailing from screw eye 10 will tend to be swung from side to side by the plate 11. However, due to the elongated form of the lure body, there may at times be a tendency present to spin, if plate 11 alone is used to provide the motion.

In order to include means for regulating the movement and prevent spinning of the lure as a whole, upon the concavely-arcuate under side 22, beneath the intermediate portion 23, at its maximum cross-section, is secured a transversely-arranged and downwardly-concave stabilizing plate 24 by means of a screw eye 25, with the eye portion of the screw disposed within the intermediate portion of the concave under side 26 of the mentioned stabilizing plate. Upon the screw eye 25 is mounted a hook assembly 26', while at the rear end 7, a further screw eye 27 is screwed into the lure body to which a further hook assembly 28 is pendently connected. The lure body proper may be made of wood, plastic or any suitable material, while plates 11 and 24, as well as anchor member 16, the screw eyes and hooks, may be made of metal, if so desired. It is also possible to make the plates mentioned of plastic. The lure body itself may also be formed or enameled to simulate fish scales, as indicated at 29.

The result of the arrangement of plates 11 and 24 described is that when line 21 is drawn to cause forward movement of the lure through the water with action plate 11 raised in the indicated position at 15 in Figure 1, continuous alternating movements from side to side will occur which will be maintained as a continuous operation by the presence of the lower intermediate and transversely-disposed stabilizing plate 24 which will cause the lure body to remain on an even keel. The hooks 26 and 28, in the meantime, incline slightly rearwardly in position to catch any fish that may be attracted close to the lure by the movements thereof.

Manifestly, variations may be resorted to and parts and features may be modified or used without others within the scope of the appended claims.

Having now fully described my invention, I claim:

1. In a fish lure comprising an elongated lure body which is upwardly arched intermediate the ends thereof, a fixed eye member secured to the concave under side of the intermediate portion of the lure body, a second eye member secured to the rear end of said lure body and hooks pendently connected to both eye members, the features which include having the forward end of the lure body provided with a recessed portion cut into said body from above, a third eye member fixed to the forward end of the latter in the recessed portion with the eye member disposed in a vertical plane, a dished action plate having an open slot in the edge thereof and an aperture spaced from the slot, said aperture and slot being simultaneously engaged by said third eye member in such fashion as to pendently hinge said dished action plate and guide the same by means of said third eye member in vertical forwardly and rearwardly swinging movement, the action plate having the concave side thereof facing forward, an angularly-bent attachment member having one arm thereof apertured and disposed rearwardly of the action plate and mounted upon the third eye member, the other arm of said attachment member extending forwardly through an intermediate portion of said action plate and apertured in the forward end to receive a fish line to be connected thereto, and a downwardly-concave elongated stabilizing plate transversely and substantially horizontally disposed with respect to the longitudinal dimension of the lure body and held to the concave under side thereof by means of the first-mentioned eye member intermediate the ends of said lure body, the latter eye member extending downwardly from the intermediate portion of the concave under side of said stabilizing plate.

2. In a fish lure having an elongated body, a dished action plate positioned adjacent the forward end of said body with the concave side of said plate facing forwardly, pivotal means secured to said forward end and operatively connected to said plate to permit a limited vertical forwardly and rearwardly swinging movement of the latter relative to said body, and an angularly bent attachment member having one arm thereof disposed rearwardly of said plate and pivotally secured to said pivotal means, the other arm of said attachment member extending forwardly through an intermediate portion of said plate and being apertured to receive a fish line for connection thereto.

3. In a fish lure having an elongated body, a dished action plate positioned adjacent the forward end of said body with the concave side of said plate facing forwardly, pivotal means secured to said forward end and operatively connected to said plate to permit a limited vertical forwardly and rearwardly swinging movement of the latter relative to said body, an angularly bent attachment member having one arm thereof disposed rearwardly of said plate and pivotally secured to said pivotal means, the other arm of said attachment member extending forwardly through an intermediate portion of said plate and being apertured to receive a fish line for connection thereto, and means secured to an intermediate portion of the underside of said body for stabilizing the movement of said lure when the latter is drawn through water.

LOUIS I. KASTE.

REFERENCES CITED

The following references are of record in the file of this patent:

UNITED STATES PATENTS

| Number | Name | Date |
| --- | --- | --- |
| 1,333,154 | Buddle | Mar. 9, 1920 |
| 1,423,025 | Rodgers et al. | July 18, 1922 |
| 1,801,951 | Buchanan | Apr. 21, 1931 |
| 1,996,776 | Strausborger | Apr. 9, 1935 |
| 2,305,865 | Goyings | Dec. 22, 1942 |
| 2,313,709 | Dunkelberger | Mar. 9, 1943 |